(12) United States Patent
Robertson et al.

(10) Patent No.: US 9,167,943 B2
(45) Date of Patent: Oct. 27, 2015

(54) CYCLONIC SEPARATOR

(71) Applicant: Dyson Technology Limited, Wiltshire (GB)

(72) Inventors: James Stuart Robertson, Malmesbury (GB); Peter Luetchford, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

(21) Appl. No.: 14/043,147

(22) Filed: Oct. 1, 2013

(65) Prior Publication Data

US 2014/0090563 A1    Apr. 3, 2014

(30) Foreign Application Priority Data

Oct. 1, 2012   (GB) .................................... 1217503.0

(51) Int. Cl.
| | |
|---|---|
| *B01D 50/00* | (2006.01) |
| *A47L 9/00* | (2006.01) |
| *B01D 45/16* | (2006.01) |
| *B01D 45/12* | (2006.01) |
| *A47L 9/16* | (2006.01) |
| *B01D 46/52* | (2006.01) |

(52) U.S. Cl.
CPC .............. *A47L 9/0081* (2013.01); *A47L 9/1608* (2013.01); *A47L 9/1641* (2013.01); *A47L 9/1658* (2013.01); *B01D 45/12* (2013.01); *B01D 45/16* (2013.01); *B01D 50/002* (2013.01); *A47L 9/1666* (2013.01); *B01D 46/521* (2013.01)

(58) Field of Classification Search
CPC ... A47L 9/1683; A47L 9/1641; A47L 9/1625; A47L 9/1666; A47L 9/1608; B01D 50/002; B01D 45/16; B01D 46/2411; B01D 45/12; B01D 46/521; B01D 45/08; B01D 46/0005; B01D 46/003; B04C 5/28; B04C 5/02
USPC ........... 55/346, 337, 343, 452, 424, 426, 428, 55/429, 432, DIG. 3; 15/353; 96/382, 385
See application file for complete search history.

(56) References Cited

U.S. PATENT DOCUMENTS

| | | | | |
|---|---|---|---|---|
| 3,130,812 | A * | 4/1964 | Hubrich ........................ | 181/256 |
| 2009/0178567 | A1* | 7/2009 | Han et al. ........................ | 96/381 |
| 2009/0249577 | A1 | 10/2009 | Ni | |
| 2010/0242221 | A1* | 9/2010 | Horne et al. .................... | 15/347 |
| 2011/0016661 | A1* | 1/2011 | Dyson et al. .................... | 15/347 |

FOREIGN PATENT DOCUMENTS

| | | |
|---|---|---|
| CN | 201855222 | 6/2011 |
| GB | 2468299 | 9/2010 |
| GB | 2472095 | 1/2011 |
| JP | 51-28364 | 3/1976 |

(Continued)

OTHER PUBLICATIONS

Search Report dated Jan. 23, 2013, directed to GB Application No. 1217503.0; 1 page.

*Primary Examiner* — Dung H Bui
(74) *Attorney, Agent, or Firm* — Morrison & Foerster LLP

(57) ABSTRACT

A cyclonic separator for a vacuum cleaner that includes a cyclone stage, a chamber and a silencer. The chamber has a plurality of ports through which fluid from the cyclone stage enters the chamber. The silencer is located in the chamber and includes a plurality of baffles. Fluid entering the chamber through the ports collides with the baffles, which act to reduce noise.

22 Claims, 6 Drawing Sheets

(56) References Cited

FOREIGN PATENT DOCUMENTS

| | | |
|---|---|---|
| JP | 7-27388 | 1/1995 |
| JP | 9-105554 | 4/1997 |
| JP | 2010-125915 | 6/2010 |
| JP | 2011-25052 | 2/2011 |

* cited by examiner

CYCLONIC SEPARATOR

REFERENCE TO RELATED APPLICATION

This application claims priority of United Kingdom Patent Application No. 1217503.0 filed Oct. 1, 2012, the entire contents of which are incorporated herein by reference.

FIELD OF THE INVENTION

The present invention relates to a cyclonic separator for a vacuum cleaner.

BACKGROUND OF THE INVENTION

Efforts are continually being made to reduce the noise generated by vacuum cleaners. The motor is frequently the target of such efforts. However, an often overlooked area for acoustic improvement is the cyclonic separator.

SUMMARY OF THE INVENTION

The present invention provides a cyclonic separator for a vacuum cleaner comprising: a cyclone stage; a chamber comprising a plurality of ports through which fluid discharged from the cyclone stage enters the chamber, and a silencer comprising a plurality of baffles, the silencer being located in the chamber such that fluid entering the chamber through one of the ports collides with a first side of one of the baffles and fluid entering the chamber through another of the ports collides with a second opposite side of the one of the baffles.

The baffles therefore act to reduce fluid from the two ports colliding with one another. As a result, a quieter cyclonic separator is achieved.

The silencer may comprise a conical body and each of the baffles may extend outwardly from the conical body. The conical body helps to redirect the fluid along the length of the chamber. For example, where the ports are arranged around the exhaust chamber, the conical body may help to redirect the fluid from a generally radial direction to a generally axial direction. In employing a conical body to redirect the fluid, less energy is imparted by the fluid to the silencer and thus less vibration and noise is generated.

The outer surface of the conical body may be concave. As a result, the conical body redirects the fluid entering the chamber along a smoother path. Less energy is therefore imparted by the fluid to the conical body and thus less vibration and noise is generated.

The conical body may be hollow. This then has the benefit of reducing the cost of the silencer. Additionally, the compliance of the conical body is increased and thus the conical body is better able to deform and absorb the energy of the colliding fluid. This is particularly true when the silencer is formed of an elastomeric material. By absorbing the energy of the colliding fluid, less vibration and thus noise is transmitted from the silencer to other parts of the cyclonic separator.

The conical body may have an open base and the cyclonic separator may comprise a disc formed of acoustic foam that covers the base. The disc then acts to better isolate the silencer from other parts of the cyclonic separator.

The silencer may be formed of an elastomeric material. As a result, the silencer is better able to deform so as to absorb the energy of the colliding fluid. Less vibration and noise are thus transmitted from the silencer to other parts of the cyclonic separator.

The cyclonic separator may comprise a filter assembly located in the chamber. The filter assembly may be elongate and hollow, and the silencer may project into an open end of the filter assembly. The filter assembly has the advantage of removing any residual dirt from the fluid. By providing a hollow filter assembly into which the silencer projects, a relatively compact arrangement is achieved.

The chamber may have a longitudinal axis about which the ports are arranged, and the silencer may be located in the chamber such that each baffle lies in a plane parallel to the longitudinal axis. In having ports arranged around the longitudinal axis, fluid entering the chamber will typically have a velocity component normal to the longitudinal axis. By having baffles that lie in planes parallel to the longitudinal axis, the baffles are better able to reduce fluid from the different ports colliding.

The chamber may have a longitudinal axis about which the ports are arranged, and fluid may enter the chamber in a direction generally normal to the longitudinal axis. The silencer may then redirect the fluid in a direction generally parallel to the longitudinal axis. As a result, a more compact cyclonic separator may be achieved. In particular, the fluid may be discharged into the chamber without first turning the fluid such that it enters the chamber in a direction generally parallel to the longitudinal axis.

The cyclone stage may comprise a plurality of cyclone bodies arranged around the chamber. In having a plurality of cyclone bodies, the separation efficiency of the cyclonic separator may be improved. Moreover, by arranging the cyclone bodies around the chamber, a more compact cyclonic separator may be realised. In contrast, a conventional cyclonic separator having a ring of cyclone bodies often makes little use of the central space around which the cyclone bodies are arranged.

The cyclonic separator may comprise a first cyclone stage, and a second cyclone stage located downstream of the first cyclone stage. Fluid discharged from the second cyclone stage then enters the chamber via the ports. The first cyclone stage is intended to remove relatively large dirt from the fluid admitted to the cyclonic separator. The second cyclone stage, which is located downstream of the first cyclone stage, is then intended to remove smaller dirt from the fluid. As a result, a cyclonic separator having a relatively high separation efficiency may be achieved.

The present invention also provides a cyclonic separator for a vacuum cleaner comprising: a cyclone stage; a chamber comprising a plurality of ports through which fluid from the cyclone stage enters the chamber; and a silencer comprising a plurality of baffles, wherein the chamber has a longitudinal axis about which the ports are arranged, the silencer is located in the chamber such that each baffle lies in a plane parallel to the longitudinal axis, and fluid entering the chamber through the ports collides with the baffles.

The baffles therefore act to reduce fluid from the different ports colliding with one another. As a result, a quieter cyclonic separator is achieved. In having ports arranged around the longitudinal axis, fluid entering the chamber will typically have a velocity component normal to the longitudinal axis. By having baffles that lie in planes parallel to the longitudinal axis, the baffles are better able to reduce fluid from the different ports colliding.

Fluid may enter the chamber in a direction generally normal to the longitudinal axis. The silencer may then redirect the fluid in a direction generally parallel to the longitudinal axis. As a result, a more compact cyclonic separator may be achieved. In particular, the fluid may be discharged into the chamber without first turning the fluid such that it enters the chamber in a direction generally parallel to the longitudinal axis.

The silencer may be formed of an elastomeric material. As a result, the silencer is better able to deform so as to absorb the energy of the colliding fluid. Less vibration and noise are thus transmitted from the silencer to other parts of the cyclonic separator.

The silencer may comprise a conical body and each of the baffles may extend outwardly from the conical body. The conical body helps to redirect the fluid along the chamber in a direction generally parallel to the longitudinal axis. In employing a conical body to redirect the fluid, less energy is imparted by the fluid to the silencer and thus less vibration and noise is generated.

The outer surface of the conical body may be concave. As a result, the conical body redirects the fluid along a smoother path. Less energy is therefore imparted by the fluid to the conical body and thus less vibration and noise is generated.

The present invention further provides a cyclonic separator for a vacuum cleaner comprising: a cyclone stage; a chamber comprising a plurality of ports through which fluid from the cyclone stage enters the chamber; a filter assembly located in the chamber; and a silencer located in the chamber, wherein the filter assembly is hollow and has an open end, the silencer projects into the open end of the filter assembly, the silencer comprises a plurality of baffles, and fluid entering the chamber through the ports collides with baffles and is redirected by the silencer into the hollow interior of the filter assembly.

The baffles therefore act to reduce fluid from the different ports colliding with one another. As a result, a quieter cyclonic separator is achieved. The filter assembly has the advantage of removing any residual dirt from the fluid. By providing a hollow filter assembly into which the silencer projects, a relatively compact arrangement may be achieved.

The silencer may comprise a conical body and each of the baffles may extend outwardly from the conical body. The conical body helps to redirect the fluid into the interior of the filter assembly. In employing a conical body to redirect the fluid, less energy is imparted by the fluid to the silencer and thus less vibration and noise is generated.

The outer surface of the conical body may be concave. As a result, the conical body redirects the fluid along a smoother path. Less energy is therefore imparted by the fluid to the conical body and thus less vibration and noise is generated.

The chamber may have a longitudinal axis about which the ports are arranged, and the filter assembly may be elongate and extend along the longitudinal axis. Furthermore, the filter assembly may comprise a filter medium shaped as hollow tube that is open at one end and is closed at an opposite end. An elongate filter assembly has the advantage of increasing the surface area of the filter medium without unduly increasing the size of the cyclonic separator in a direction normal to the longitudinal axis. By employing a filter medium that is open at one end and closed at the opposite end, fluid entering the interior of the filter medium via the open end acts to inflate the filter medium. It is not therefore necessary for the filter to include a frame or other support structure to retain the shape of the filter.

Fluid may enter the chamber in a direction generally normal to the longitudinal axis. The silencer may then redirect the fluid in a direction generally parallel to the longitudinal axis. As a result, a more compact cyclonic separator may be achieved. In particular, the fluid may be discharged into the chamber without first turning the fluid such that it enters the chamber in a direction generally parallel to the longitudinal axis.

The cyclone stage may comprise a plurality of cyclone bodies arranged around the chamber. In having a plurality of cyclone bodies, the separation efficiency of the cyclonic separator may be improved. Moreover, by arranging the cyclone bodies around the chamber, a more compact cyclonic separator may be realised. In contrast, a conventional cyclonic separator having a ring of cyclone bodies often makes little use of the central space around which the cyclone bodies are arranged.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION OF THE INVENTION

Figure 1:
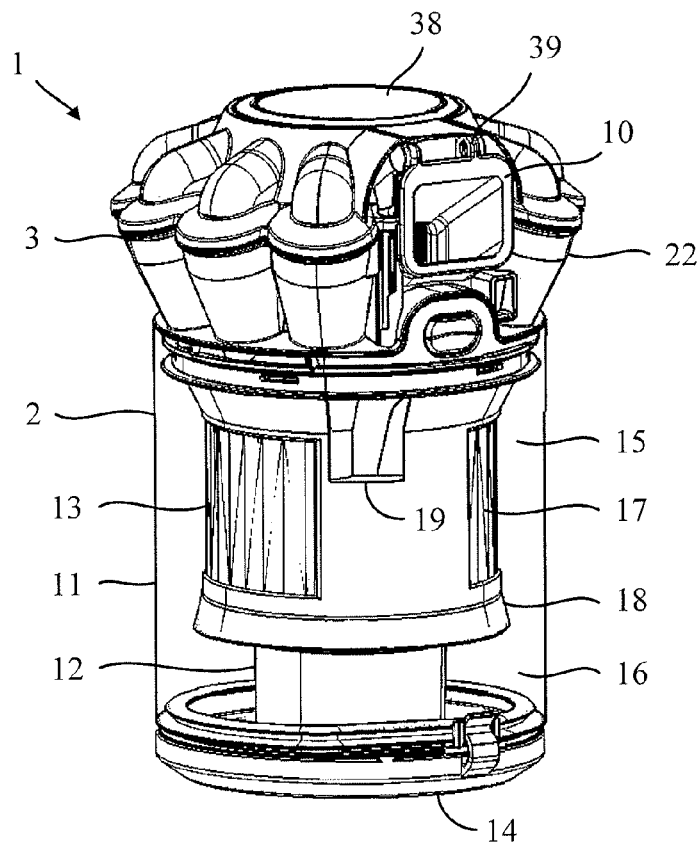
FIG. 1 is an orthographic view of a cyclonic separator in accordance with the present invention.
Figure 2:
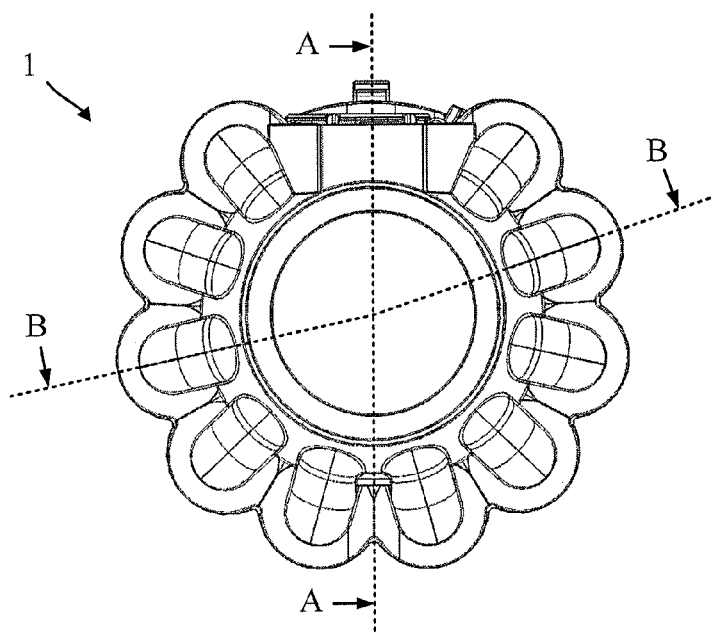
FIG. 2 is a plan view from above of the cyclonic separator.
Figure 3:
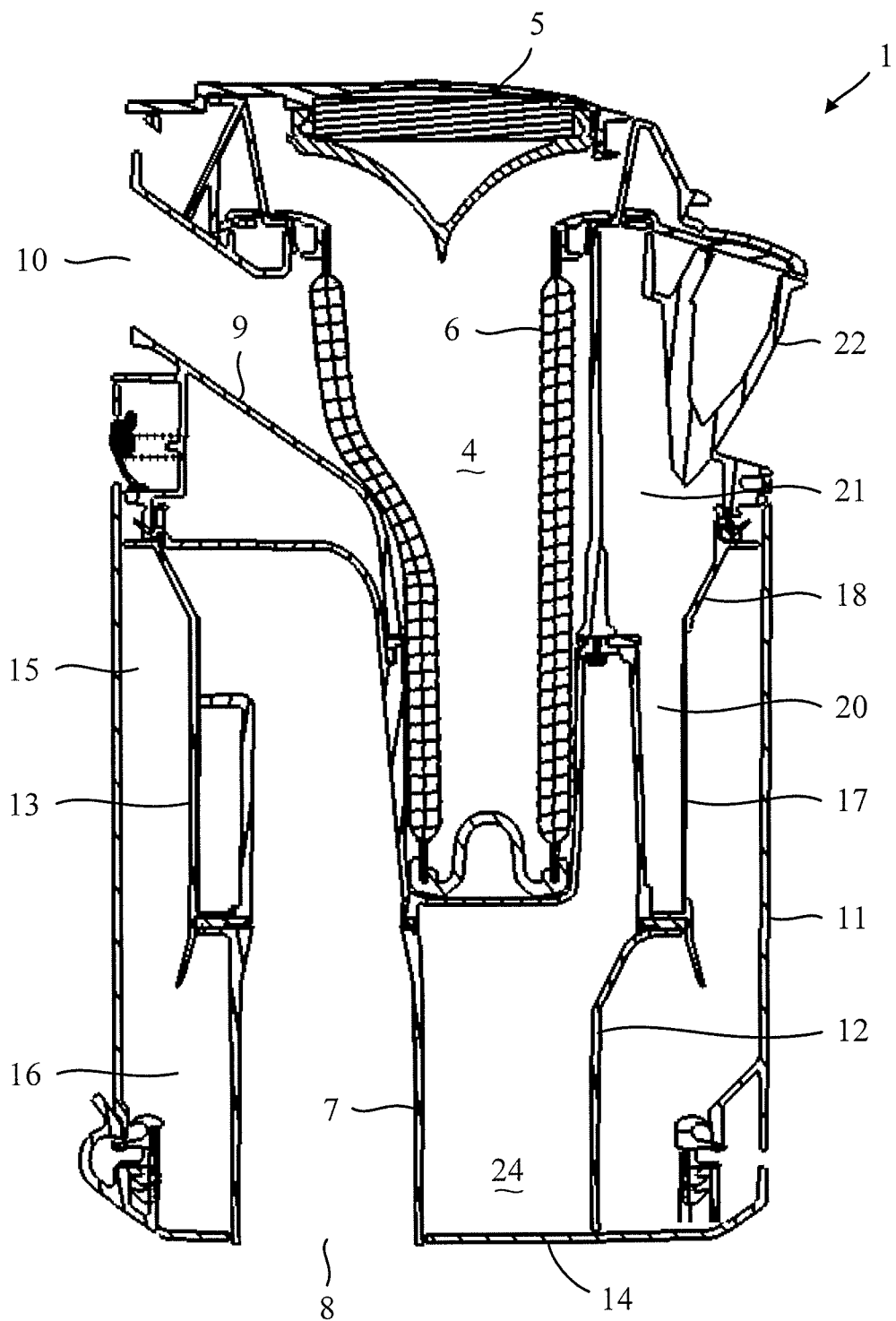
FIG. 3 is a sectional slice of the cyclonic separator taken in the plane A-A.
Figure 4:
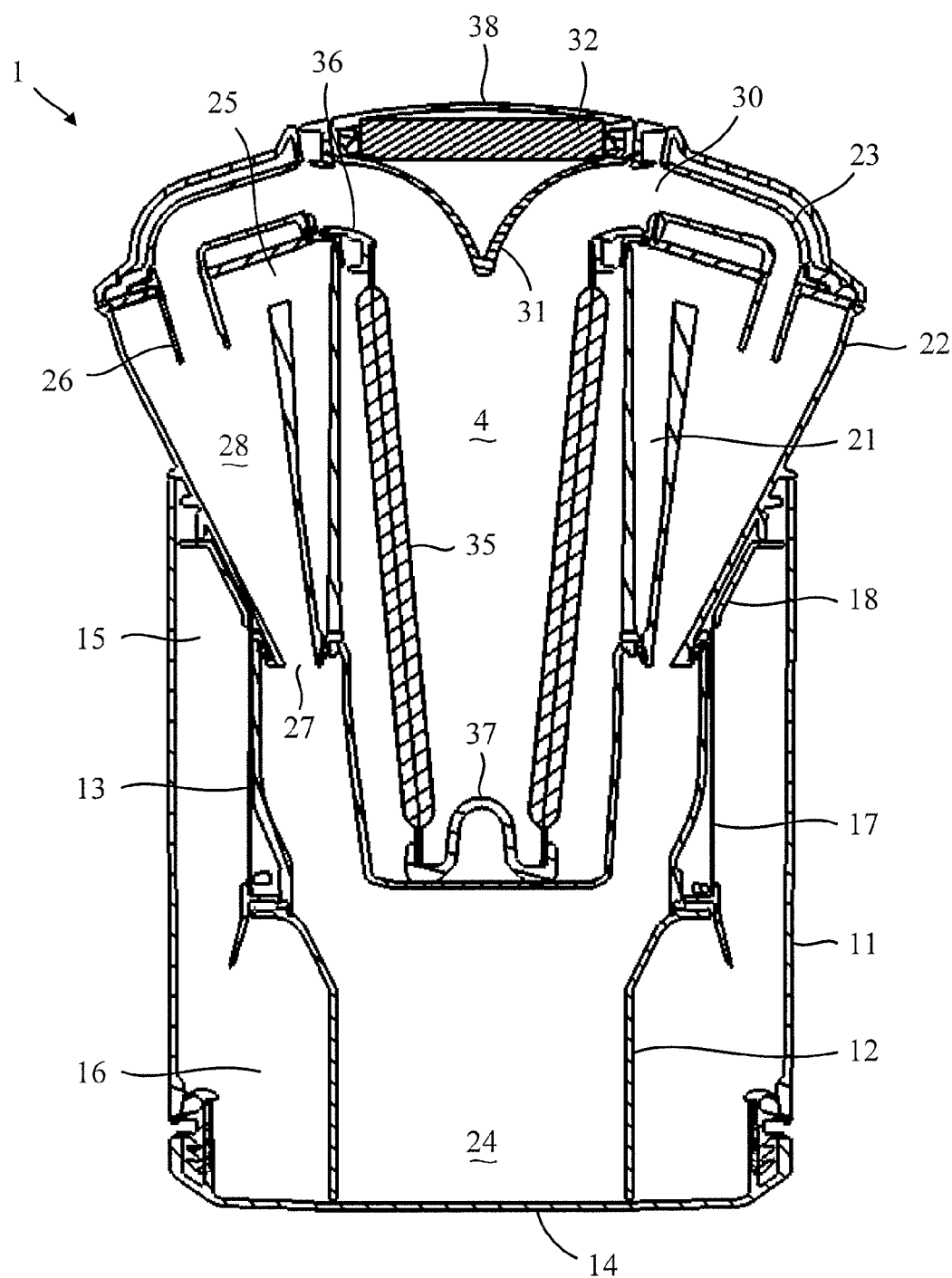
FIG. 4 is a sectional slice of the cyclonic separator taken in the plane B-B.
Figure 5:
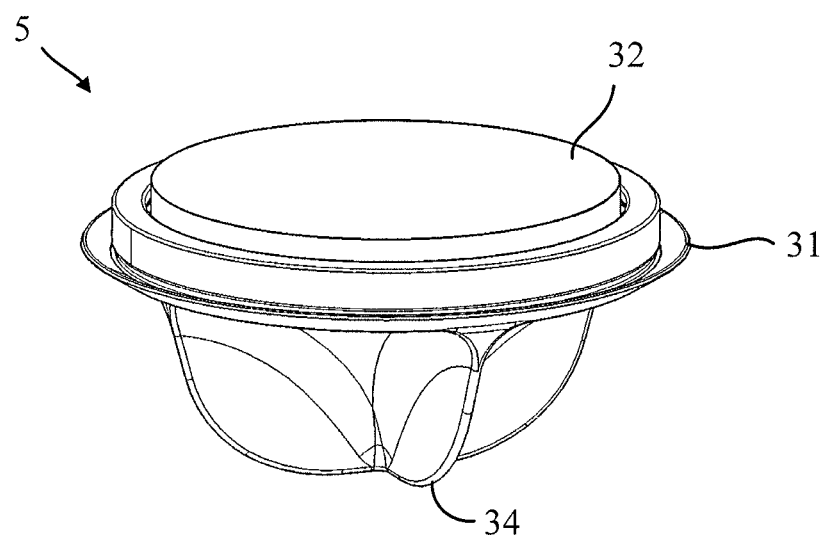
FIG. 5 is an orthographic view from above of a silencer assembly of the cyclonic separator.
Figure 6:
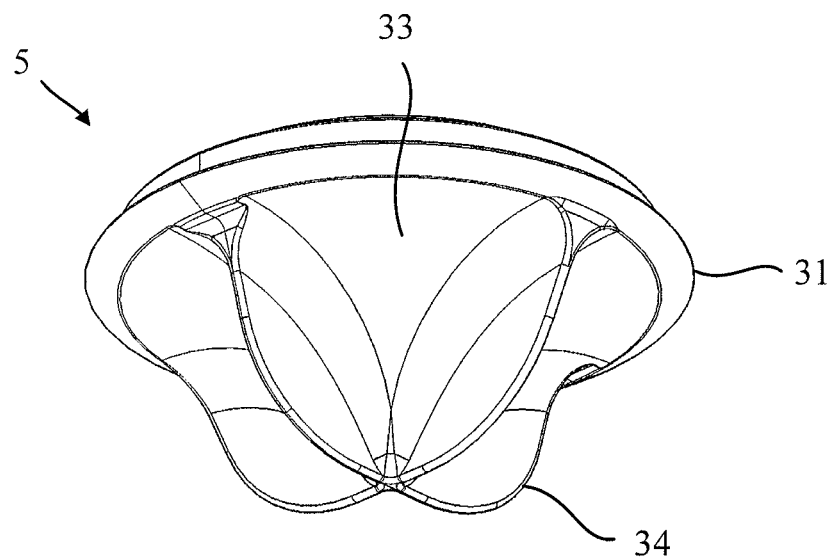
FIG. 6 is an orthographic view from below of the silencer assembly.

The cyclonic separator 1 of FIGS. 1-6 comprises a first cyclone stage 2, a second cyclone stage 3 located downstream of the first cyclone stage 2, an exhaust chamber 4 located downstream of the second cyclone stage 3, a silencer assembly 5 and a filter assembly 6 located in the exhaust chamber 4, an inlet duct 7 for carrying fluid from an inlet 8 to the first cyclone stage 3, and an outlet duct 9 for carrying fluid from the exhaust chamber 4 to an outlet 10.

The first cyclone stage 2 comprises an outer wall 11, an inner wall 12, a shroud 13 located between the outer and inner walls 11,12, and a base 14.

The outer wall 11 is cylindrical in shape and surrounds the inner wall 12 and the shroud 13. The inner wall 12 and the shroud 13 are generally cylindrical in shape and are arranged concentrically with the outer wall 11. The outer wall 11 is sealed at an upper end against the shroud 13. The lower end of the outer wall 11 and the lower end of the inner wall 12 are sealed against and closed off by the base 14. The outer wall 11, the inner wall 12, the shroud 13 and the base 14 thus collectively define a chamber. The upper part of this chamber (i.e. that part generally defined between the outer wall 11 and the shroud 13) defines a cyclone chamber 15, whilst the lower part of the chamber (i.e. that part generally defined between the outer wall 11 and the inner wall 12) defines a dirt collection chamber 16.

The shroud 13 comprises a mesh 17 supported on a frame 18. The frame 18 includes an aperture 19, through which fluid enters the cyclone chamber 15. The mesh 17 comprises a plurality of perforations through which fluid exits the cyclone chamber 15. The shroud 13 therefore serves as both an inlet and an outlet for the cyclone chamber 15.

The space between the shroud 13 and the inner wall 12 defines a fluid passageway 20 that is closed at a lower end by the frame 18. The fluid passageway 20 is open at an upper end and provides an outlet for the first cyclone stage 2.

The second cyclone stage 3 comprises a plenum 21, a plurality of cyclone bodies 22, a plurality of guide ducts 23 and a dirt collection chamber 24. In order to distinguish the dirt collection chamber 24 from that of the first cyclone stage 2, the dirt collection chamber 16 of the first cyclone stage 2 will hereafter be referred to as the first dirt collection chamber 16, and the dirt collection chamber 24 of the second cyclone stage 3 will hereafter be referred to as the second dirt collection chamber 24.

The plenum 21 is in fluid communication with the outlet of the first cyclone stage 2 (i.e. the fluid passageway 20) and with the inlets 25 of the cyclone bodies 22. Fluid from the first cyclone stage 2 therefore divides and feeds each of the cyclone bodies 22.

The cyclone bodies 22 are arranged in a ring about a central longitudinal axis of the cyclonic separator 1. Each cyclone body 22 is generally frusto-conical in shape and comprises a tangential inlet 25, a vortex finder 26, and a cone opening 27. The interior of each cyclone body 22 defines a cyclone chamber 28. Fluid from the plenum 21 enters the cyclone chamber 28 via the tangential inlet 32. Dirt separated within the cyclone chamber 28 is then discharged through the cone opening 27 whilst the cleansed fluid exits through the vortex finder 26.

Each guide duct 23 extends between a respective vortex finder 26 and the exhaust chamber 4. Consequently, fluid discharged from the cyclone bodies 22 is carried by the guide ducts 23 to the exhaust chamber 4.

The second dirt collection chamber 24 is defined by the interior space bounded by the inner wall 12 and the base 14 of the first cyclone stage 2. The cone opening 27 of each cyclone body 22 projects into the second dirt collection chamber 24 such that dirt separated by the cyclone bodies 22 falls into the second dirt collection chamber 24.

The exhaust chamber 4 is generally cylindrical in shape and extends centrally along the longitudinal axis of the cyclonic separator 1. The ends of the guide ducts 23 may be regarded as ports 30 through which fluid from second cyclone stage 3 is discharged into the exhaust chamber 4. The ports 30 are located at an upper end of the exhaust chamber 4 and arranged about the longitudinal axis of the exhaust chamber 4. Fluid then enters the exhaust chamber 4 in directions generally normal to the longitudinal axis.

The silencer assembly 5 comprises a silencer 31 and a covering disc 32. The silencer 31 comprises a conical body 33 and a plurality of baffles 34. The conical body 33 is hollow and has a concave outer surface. Each of the baffles 34 is generally planar and extends axially from the base to the apex of the conical body 33. Additionally, each baffle 34 extends radially outward from the conical body 33. In the present embodiment, the silencer 31 comprises four baffles spaced evenly around the conical body 33 such that, when viewed along the axis of the conical body 33, the baffles 34 resemble a cruciform (see, for example, FIG. 7). The covering disc 32 covers the open base of the conical body 33.

The silencer assembly 5 is located centrally at the top of exhaust chamber 4. The silencer assembly 5 is arranged such that the conical body 33 projects downward into the exhaust chamber 4. As explained below in more detail, the silencer assembly 5 acts to guide fluid entering the exhaust chamber 4 in a downwards direction. Moreover, the silencer assembly 5 does this in a way that reduces noise.

The filter assembly 6 is elongated in shape and comprises a filter medium 35, a support rim 36, and an end cap 37. The filter medium 35 is shaped into a hollow tube that is held open at an upper end by the support rim 36, and is closed off at a lower end by the end cap 37. The filter assembly 6 is located in the exhaust chamber 4 downstream of the silencer assembly 5. The support rim 36 seals against the wall of the exhaust chamber 4 at a point below the ports 30. On entering the exhaust chamber 4, fluid from the second cyclone stage 3 is drawn downwards and into the hollow interior of the filter assembly 6. From there, the fluid is drawn through the filter medium 35 and into the outlet duct 9.

The inlet 8 of the cyclonic separator 1 is located in the base 14. The inlet duct 7 then extends upwardly from the inlet 8 and through the interior space bounded by the inner wall 12. At a height corresponding to an upper part of the first cyclone stage 2, the inlet duct 7 turns and extends through the inner wall 12, through the fluid passageway 20, and terminates at the aperture 19 in the shroud 13.

The outlet 10 of the cyclonic separator 1 is located between two adjacent cyclone bodies 22 of the second cyclone stage 3. The outlet duct 9 then extends from the exhaust chamber 4 to the outlet 10.

During use, dirt-laden fluid is drawn into the cyclonic separator 1 via the inlet 8 in the base 14. From there, the dirt-laden fluid is carried by the inlet duct 7 to the aperture 19 in the shroud 13. The dirt-laden fluid then enters the cyclone chamber 15 of the first cyclone stage 2. The dirt-laden fluid spirals about the cyclone chamber 15 causing coarse dirt to be separated from the fluid. The coarse dirt collects in the first dirt collection chamber 16, whilst the partially-cleansed fluid is drawn through the mesh 17 of the shroud 13, up through the fluid passageway 20, and into the plenum 21 of the second cyclone stage 3. The partially-cleansed fluid then divides and is drawn into the cyclone bodies 22 via the tangential inlets 25. The partially-cleansed fluid then spirals about the cyclone chamber 28 of each cyclone body 22 causing fine dirt to be separated from the fluid. The fine dirt is discharged through the cone opening 27 and into the second dirt collection chamber 24. The cleansed fluid is drawn up through the vortex finders 26 and along the guide ducts 23 to the exhaust chamber 4. From there, the cleansed fluid is directed downwards by the silencer assembly 5 and into the interior of the filter assembly 6. The fluid passes through the filter medium 35, which acts to remove any residual dirt from the fluid. The fluid is then drawn along the outlet duct 9 and through the outlet 10 of the cyclonic separator 1.

A more detailed discussion of the silencer assembly 5 will now follow.

As noted above, fluid from the second cyclone stage 3 enters the exhaust chamber 4 via the ports 30 that are arranged around the upper end of the exhaust chamber 4. Each port 30 may be said to introduce a respective fluid stream into the chamber 4. On entering the exhaust chamber 4, the fluid streams collide with the silencer 31. In colliding with the silencer 31, the conical body 33 redirects the fluid streams downward, i.e. the conical body 33 redirects each fluid stream from a generally radial direction to a generally axial direction. By having a concave outer surface, the conical body 33 turns each fluid stream along a smoother path or curve. As a result, less energy is imparted by the fluid streams to the conical body 33 and thus less vibration and noise is generated by the collision. In addition to colliding with the conical body 33, the fluid streams also collide with the baffles 34. As will now be explained, the baffles 34 act to reduce clashing of the fluid streams.

Figure 7:
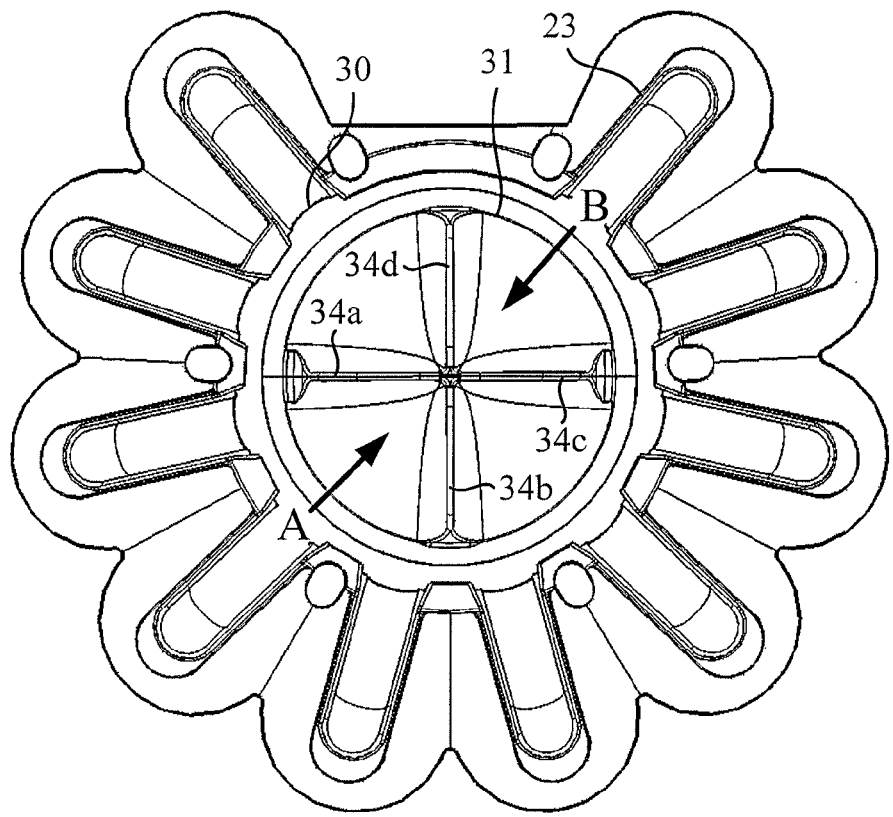
FIG. 7 is a plan view from below of the silencer assembly and the guide ducts of the cyclonic separator.

FIG. 7 is a plan view from below of the silencer 31 and the guide ducts 23. A first fluid stream enters the exhaust chamber 4 via port A and travels in a first direction (approximately from left to right). A second fluid stream enters the exhaust chamber 4 via port B and travels in a second direction (approximately from right to left). Since port B is directly opposite port A, the two fluid streams travel in opposite directions. In the absence of the silencer 31, the two fluid streams will collide with one another. Since the two fluid streams are travelling in opposite directions, the collision is relatively violent and generates a significant level of noise. With the introduction of the silencer 31, the collision of the two fluid streams is prevented or significantly reduced.

The conical body 33 is positioned between the two ports A,B. Consequently, a fraction of each of the two fluid streams is redirected downwards by the conical body 33. The conical body 33 is tapered and has a concave outer surface. As a result, the conical body 33 presents a relatively small impact area for the two fluid streams. Additionally, each of the fluid streams diffuses on entering the exhaust chamber 4. It is for this reason that only a fraction of the two fluid streams collides with and is redirected downwards by the conical body 33. The remaining fraction collides with the baffles 34. In colliding with the baffles 34, the two fluid streams are prevented from colliding with one another. It can be seen from FIG. 7 that two of the baffles 34a,34b act to contain the first fluid stream within a lower-left quadrant of the silencer 31, whilst the other two baffles 34c,34d act to contain the second fluid stream within an upper-right quadrant. As a result, the two fluid streams are prevented from colliding violently with one another. The two fluid streams merge only after they have been redirected downwards by the silencer 31. Since both fluid streams are then travelling in approximately the same direction, the collision of the two fluid streams and the resulting noise are significantly reduced.

Figure 8:
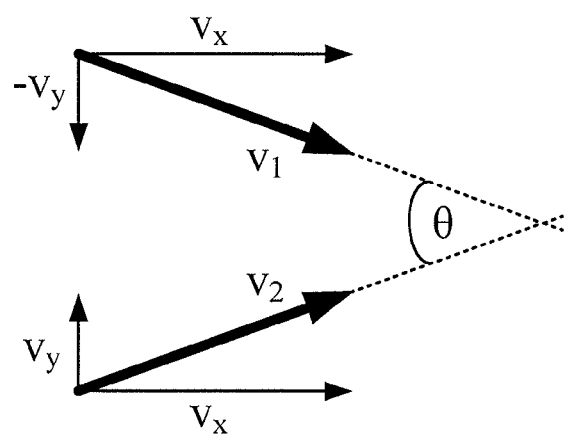
FIG. 8 illustrates two convergent fluid streams having velocities resolved into components.

As illustrated in FIG. 8, any two fluid streams that converge must have velocity components, $v_y$ and $-v_y$, that act in opposition. The noise generated by the collision of the two fluid streams is determined by the magnitudes of the opposing velocity components. As the angle, $\theta$, between the two fluid streams increases, so too does the magnitude of the opposing velocity components. By employing four baffles 34 arranged in a cruciform, the maximum angle at which any two fluid streams can collide is 90 degrees. As a result, the magnitudes of the opposing velocity components may be kept within reasonable limits Indeed, owing to the particular number and arrangement of ports 30 in the present embodiment, the maximum angle between any two colliding fluid streams is around 62 degrees.

Figure 9:
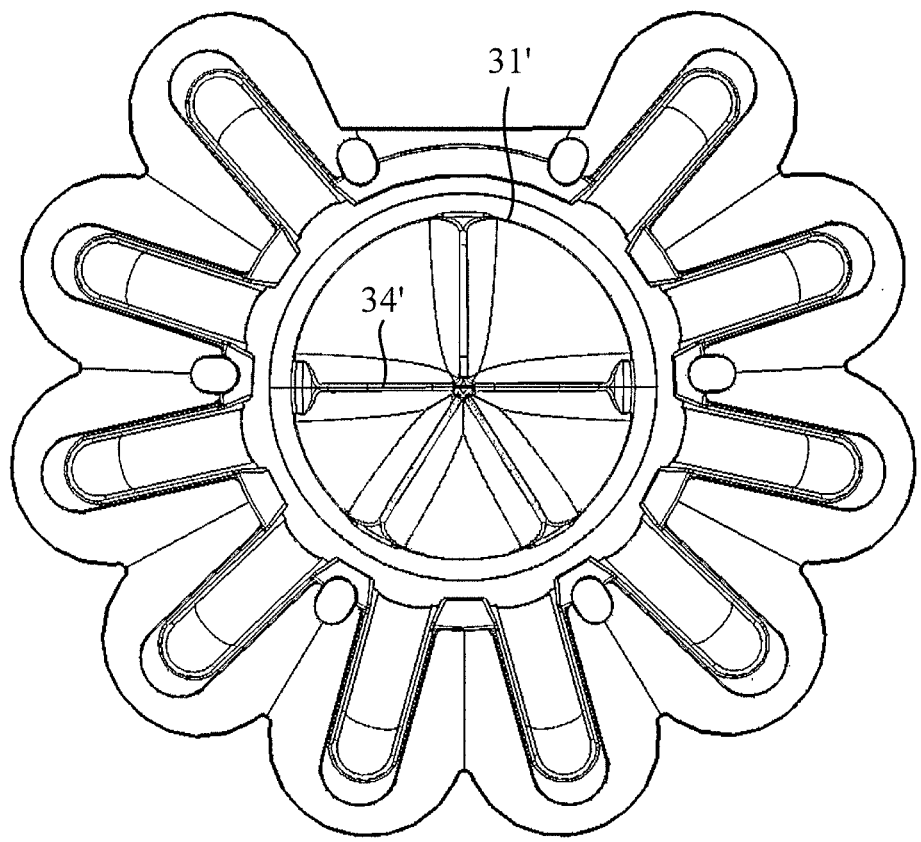
FIG. 9 is a plan view from below of an alternative silencer assembly employed with the cyclonic separator.

Although the silencer 31 described above comprises four baffles 34, the silencer 31 could equally comprise a different number of baffles 34. For example, a silencer having fewer baffles may lead to cost savings. Conversely, a silencer having additional baffles may lead to acoustic improvements. During development, the silencer 31 originally had ten baffles. However, it was subsequently found that reducing the number of baffles to four led to a cost saving without a significant increase in noise. In addition to having a different number of baffles 34, it is not essential that the baffles 34 are spaced evenly around the conical body 33. For example, FIG. 9 illustrates an alternative silencer 31' having five baffles 34' that are not evenly spaced. The number and arrangement of baffles 34 will therefore depend on the particular design and specification requirements of the cyclonic separator 1.

The silencer 31 projects into the open end of the filter assembly 6. As a result, a relatively compact arrangement is achieved for the cyclonic separator 1. During development it was found that a longer silencer 31 led to further acoustic improvements. It is thought that the reason for this is that the silencer 31 further straightens the fluid streams before they merge. However, a shorter silencer 31 was employed in order to facilitate removal of the filter assembly 6. The filter assembly 6 is removed by opening a top part of the outer casing 38 of the cyclonic separator 1. The top part is hinged 39 at a point adjacent the outlet 10, see FIG. 1. Upon opening the top part of the casing 38 the silencer assembly 5, which is attached to the casing 38, swings upward and outward. A shorter silencer 31 was employed in order to ensure that the silencer 31 clears the filter assembly 6.

The conical body 33 of the silencer 31 is hollow, which has at least two benefits. First, it reduces the material cost of the silencer 31. Second, it increases the compliance of the conical body 33, which is then better able to absorb the collisions of the fluid streams. However, in being hollow, a cavity is created between the conical body 33 and the outer casing 38 of the cyclonic separator 1. As the silencer 31 vibrates due to the colliding fluid streams, the air within the cavity also vibrates, which is then transmitted to the outer casing 38. The covering disc 32 covers the open base of the silencer 31 and acts to absorbing the energy of the vibrating air. As a result, less of the vibration of the silencer 31 is transmitted to the outer casing 38.

The conical body 33 helps to redirect the fluid streams along a smoother path. This then has acoustic as well as fluid flow benefits. However, the conical body 33 is not essential in order to reduce clashing of the fluid streams, which can be achieved by means of the baffles 34 only.

The silencer 31 is formed of an elastomeric material. This has the benefit that the silencer 31 is better able to deform and absorb the energy of the colliding fluid streams. As a result, less vibration and thus noise is transmitted from the silencer 31 to other parts of the cyclonic separator 1.

Although a particular design of cyclonic separator has thus far been described, the silencer may be employed in other types of cyclonic separator for which fluid from a cyclone stage is discharged into a chamber via a plurality of ports. The baffles of the silencer then act to reduce clashing of the fluid entering the chamber. In particular, rather than colliding directly with one another, fluid entering the chamber collides with the baffles.

The invention claimed is:

1. A cyclonic separator for a vacuum cleaner comprising:
  a cyclone stage;
  a chamber comprising a plurality of ports through which fluid from the cyclone stage enters the chamber; and
  a silencer comprising a plurality of baffles, wherein each of the baffles is generally planar, and the silencer is located in the chamber such that fluid entering the chamber through one of the ports collides with a first side of one of the baffles and fluid entering the chamber through another of the ports collides with a second opposite side of the one of the baffles.

2. The cyclonic separator of claim 1, wherein the silencer comprises a conical body and each of the baffles extends outwardly from the conical body.

3. The cyclonic separator of claim 2, wherein the outer surface of the conical body is concave.

4. The cyclonic separator of claim 2, wherein the conical body is hollow.

5. The cyclonic separator of claim 4, wherein the conical body has an open base and the cyclonic separator comprises a disc formed of acoustic foam that covers the base.

6. The cyclonic separator of claim 1, wherein the silencer is formed of an elastomeric material.

7. The cyclonic separator of claim 1, wherein the cyclonic separator comprises a filter assembly located in the chamber, the filter assembly is elongate and hollow, and the silencer projects into an open end of the filter assembly.

8. The cyclonic separator of claim 1, wherein the chamber has a longitudinal axis about which the ports are arranged, and the silencer is located in the chamber such that each baffle lies in a plane parallel to the longitudinal axis.

9. The cyclonic separator of claim 1, wherein the chamber has a longitudinal axis about which the ports are arranged, fluid enters the chamber in a direction generally normal to the longitudinal axis, and the silencer redirects the fluid in a direction generally parallel to the longitudinal axis.

10. The cyclonic separator of claim 1, wherein the cyclone stage comprises a plurality of cyclone bodies arranged around the chamber.

11. The cyclonic separator of claim 10, wherein the cyclonic separator comprises a first cyclone stage, and the cyclone stage is a second cyclone stage located downstream of the first cyclone stage.

12. A cyclonic separator for a vacuum cleaner comprising:
a cyclone stage;
a chamber comprising a plurality of ports through which fluid from the cyclone stage enters the chamber; and
a silencer comprising a plurality of baffles,
wherein the chamber has a longitudinal axis about which the ports are arranged, each of the baffles is generally planar, the silencer is located in the chamber such that each baffle lies in a plane parallel to the longitudinal axis, and fluid entering the chamber through the ports collides with the baffles.

13. The cyclonic separator of claim 12, wherein fluid enters the chamber in a direction generally normal to the longitudinal axis, and the silencer redirects the fluid in a direction generally parallel to the longitudinal axis.

14. The cyclonic separator of claim 12, wherein the silencer is formed of an elastomeric material.

15. The cyclonic separator of claim 12, wherein the silencer comprises a conical body and each of the baffles extends outwardly from the conical body.

16. The cyclonic separator of claim 15, wherein the outer surface of the conical body is concave.

17. A cyclonic separator for a vacuum cleaner comprising:
a cyclone stage;
a chamber comprising a plurality of ports through which fluid from the cyclone stage enters the chamber;
a filter assembly located in the chamber; and
a silencer located in the chamber,
wherein the filter assembly is hollow and has an open end, the silencer projects into the open end of the filter assembly, the silencer comprises a plurality of baffles, each of the baffles is generally planar, and fluid entering the chamber through the ports collides with baffles and is redirected by the silencer into the hollow interior of the filter assembly.

18. The cyclonic separator of claim 17, wherein the silencer comprises a conical body and each of the baffles extends outwardly from the conical body.

19. The cyclonic separator of claim 18, wherein the outer surface of the conical body is concave.

20. The cyclonic separator of claim 17, wherein the chamber has a longitudinal axis about which the ports are arranged, the filter assembly is elongate and extends along the longitudinal axis, and the filter assembly comprises a filter medium shaped as hollow tube that is open at one end and is closed at an opposite end.

21. The cyclonic separator of claim 20, wherein fluid enters the chamber in a direction generally normal to the longitudinal axis, and the silencer redirects the fluid in a direction generally parallel to the longitudinal axis.

22. The cyclonic separator of claim 17, wherein the cyclone stage comprises a plurality of cyclone bodies arranged around the chamber.

* * * * *